United States Patent
Wallin et al.

(10) Patent No.: US 11,132,904 B1
(45) Date of Patent: Sep. 28, 2021

(54) AUTOMATIC DISPATCH SYSTEM FOR TOW SERVICE PROVIDERS

(71) Applicant: IAA, Inc., Westchester, IL (US)

(72) Inventors: Brett Wallin, Westchester, IL (US); Anthony Roth, Westchester, IL (US); Christopher Poulos, Westchester, IL (US); Mradul Modi, Westchester, IL (US)

(73) Assignee: IAA, Inc., Westchester, IL (US)

( * ) Notice: Subject to any disclaimer, the term of this patent is extended or adjusted under 35 U.S.C. 154(b) by 0 days.

(21) Appl. No.: 17/062,823

(22) Filed: Oct. 5, 2020

Related U.S. Application Data

(63) Continuation of application No. 16/876,440, filed on May 18, 2020, now Pat. No. 10,796,583.

(51) Int. Cl.
*G08G 1/00* (2006.01)
*G01C 21/36* (2006.01)
(Continued)

(52) U.S. Cl.
CPC ......... *G08G 1/202* (2013.01); *G01C 21/3605* (2013.01); *G06Q 10/10* (2013.01); *G06Q 40/08* (2013.01); *G08G 1/205* (2013.01)

(58) Field of Classification Search
CPC .......... H04B 7/00; H04L 29/06; H04M 1/725; H04N 7/18; G06K 9/00; G06G 7/00; G06F 7/00; G06F 16/9032; G06F 17/00; G06F 17/22; G06F 19/00; G06F 3/01; G06F 3/0484; G06Q 20/32; G06Q 30/02; G06Q 30/06; G06Q 40/08; G06Q 10/00; G06Q 10/02; G06Q 10/06; G06Q 10/06311; G06Q 10/063112; G06Q 10/063114; G06Q 10/063116; G06Q 10/0637; G06Q 10/0834; G06Q 10/08; G06Q 10/083; G06Q 10/087; G06Q 10/0875; G06Q 10/10; G06Q 40/50; G06Q 40/00; G06Q 40/20; G06Q 40/30; G01C 22/00; G01C 21/00; G01C 21/34; G01C 21/36; G01C 21/3605; G07B 15/02; G07C 5/00; G08B 29/18; G16H 40/20; B60R 13/10; B60R 16/023; H04W 4/00; H04W 4/02; H04W 4/06; H04W 4/12; H04W 4/30; H04W 4/38; G01S 5/00; G01S 5/0009; G01S 5/0045; G01S 2205/00;

(Continued)

(56) References Cited

U.S. PATENT DOCUMENTS

2013/0096815 A1   4/2013   Mason et al.
2016/0092962 A1   3/2016   Wasserman et al.

*Primary Examiner* — Anthony R Jimenez
(74) *Attorney, Agent, or Firm* — Faegre Drinker Biddle & Reath LLP

(57) ABSTRACT

A work assignment request message, generated by a user device based on input provided by a tow service provider via the user device, is received at an enterprise server device. An initial pool of tow request stocks for potential fulfillment by the tow service provider is selected from a set of pending tow request stocks. A refined pool of tow request stocks is generated to exclude, from the initial pool, tow request stocks for which the tow service provider does not meet at least one fulfillment requirement. An optimized pool of tow request stocks is generated to include one or more tow request stocks selected, according to one or more optimization criteria, from the refined pool of tow request stocks. Information assigning the tow request stocks in the optimized pool of tow request stocks is transmitted from the enterprise server device to the user device.

7 Claims, 8 Drawing Sheets

(51) Int. Cl.
 *G06Q 40/08* (2012.01)
 *G06Q 10/10* (2012.01)
(58) Field of Classification Search
 CPC ......... G01S 2205/001; G01S 2205/008; G01S 2205/01; B60W 2300/00; B60W 2300/12; B60W 2300/123; B60W 2300/125; B60W 2300/50; B60W 2300/14; B60W 27/00; B60W 27/0011; B60Y 2300/28; G08G 1/205; G08G 1/00; G08G 1/01; G08G 1/123; G08G 1/16; G08G 1/104; G08G 1/0137; G08G 1/0141; G08G 1/017; G08G 1/07; G08G 1/0968; G08G 1/202
 USPC ....................................................... 701/117
 See application file for complete search history.

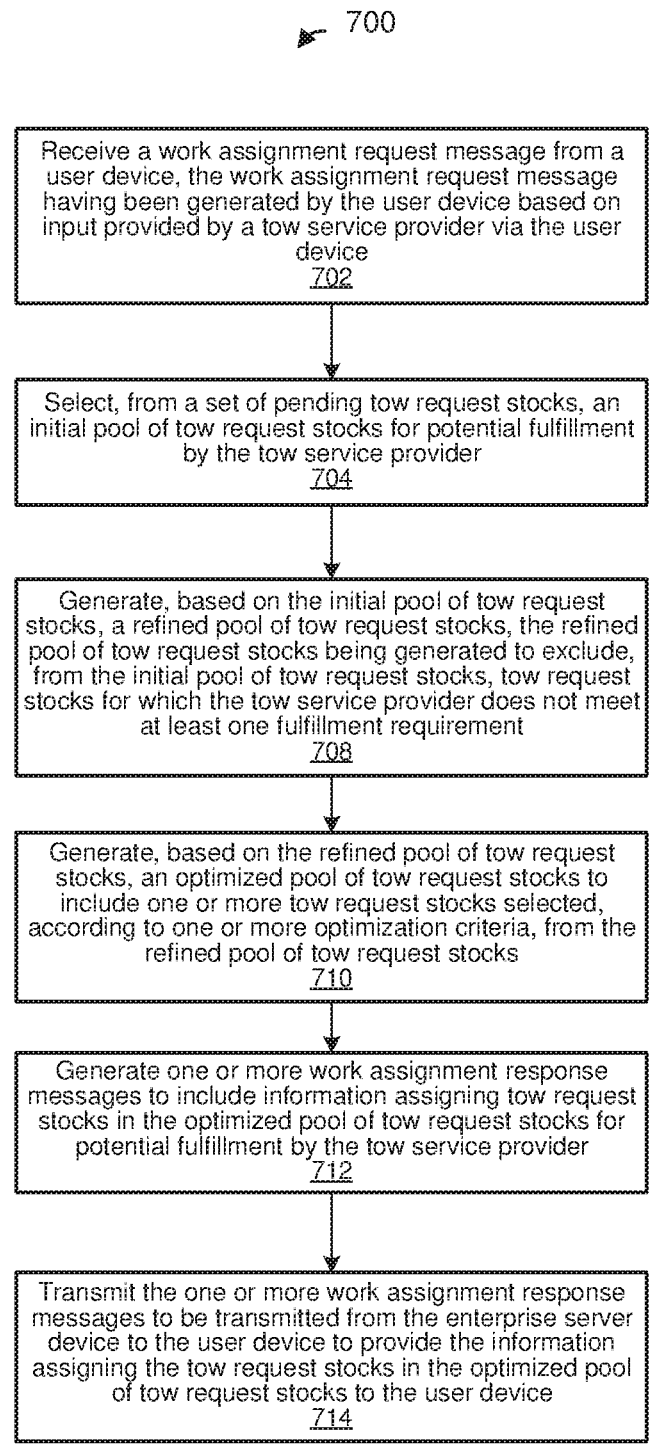

AUTOMATIC DISPATCH SYSTEM FOR TOW SERVICE PROVIDERS

CROSS-REFERENCE TO RELATED APPLICATIONS

This application is a continuation of U.S. patent application Ser. No. 16/876,440, filed May 18, 2020, now U.S. Pat. No. 10,796,583, which is incorporated herein by reference.

FIELD OF THE DISCLOSURE

The present disclosure relates generally to automatic work assignment systems, more particularly, to automatic dispatch of work assignments to tow service providers.

BACKGROUND

Vehicle hauling equipment, such as tow trucks, are often utilized to transport damaged or totaled motor vehicles to auction yards, for example. An owner of a damaged or totaled vehicle may make an insurance claim to an insurance provider with which the owner has insured the vehicle. Upon processing the insurance claim and declaring the vehicle as a non-repair or a total loss damaged vehicle, the insurance provider may arrange for the vehicle to be picked up from its current location and to be transported to a tow yard or another suitable location. In some cases, the insurance company may employ or partner with a third party provider for pickup and sales of the damaged vehicles. When the vehicle is picked up, the owner of the vehicle may receive a compensation payment from the insurance provider. The damaged or totaled vehicle can then be sold to an interested party in an auction or another suitable type of sale, for example.

Tow service providers, such as tow truck drivers, typically obtain work assignments from insurance providers, or third party providers, by visiting a facility of the insurance or the third party provider. An operator at the facility manually selects tow assignments that may be suitable for fulfillment by the tow truck driver, prepares paperwork to assign the selected assignments to the tow truck driver, and provides the paperwork to the tow truck driver. The tow truck driver can then complete the assignments by picking up the assigned vehicles from vehicle pickup locations and dropping the vehicles off at vehicle drop off destinations. Such manual work assignment procedures are often inefficient and time consuming, and often result in significant delays in vehicle pickups, particularly in catastrophe situations in which many vehicles may be damaged in a particular geographical area in a short span of time, for example due to a fire, a flood, a tornado, a hurricane, etc. in the particular geographical area. Such delays can result in prolonged blockages of roads by the damaged vehicles, for example, and may cause overpayment to storage yards and delays in insurance payments to the owners of the damaged vehicles.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely summarizes some of the concepts of the disclosure as a prelude to the more detailed description provided thereafter.

In an embodiment, a method for dispatching work assignments to tow service providers includes receiving, at a processor of an enterprise server device, a work assignment request message from a user device, the work assignment request message having been generated by the user device based on input provided by a tow service provider via the user device. The method also includes selecting, with the processor from a set of pending tow request stocks, an initial pool of tow request stocks for potential fulfillment by the tow service provider. The method additionally includes generating, with the processor based on the initial pool of tow request stocks, a refined pool of tow request stocks, the refined pool of tow request stocks being generated to exclude, from the initial pool of tow request stocks, tow request stocks for which the tow service provider does not meet at least one fulfillment requirement, and generating, with the processor based on the refined pool of tow request stocks, an optimized pool of tow request stocks to include one or more tow request stocks selected, according to one or more optimization criteria, from the refined pool of tow request stocks. The method further includes generating, with the processor, one or more work assignment response messages to include information assigning tow request stocks in the optimized pool to the tow service provider, and causing, with the processor, the one or more work assignment response messages to be transmitted from the enterprise server device to the user device to provide the information assigning the tow request stocks in the optimized pool of tow request stocks to the user device.

In another embodiment, a tangible, non-transitory computer readable medium, or media, storing machine readable instructions that, when executed by one or more processors, cause the one or more processors to: receive a work assignment request message from a user device, the work assignment request message having been generated by the user device based on input provided by a tow service provider via the user device; select, from a set of pending tow request stocks, an initial pool of tow request stocks for potential fulfillment by the tow service provider; generate, based on the initial pool of tow request stocks, a refined pool of tow request stocks, the refined pool of tow request stocks being generated to exclude, from the initial pool of tow request stocks, tow request stocks for which the tow service provider does not meet at least one fulfillment requirement; generate, based on the refined pool of tow request stocks, an optimized pool of tow request stocks to include one or more tow request stocks selected, according to one or more optimization criteria, from the refined pool of tow request stocks; generate one or more work assignment response messages to include information assigning tow request stocks in the optimized pool to the tow service provider; and cause the one or more work assignment response messages to be transmitted from the enterprise server device to the user device to provide the information assigning the tow request stocks in the optimized pool of tow request stocks to the user device.

In still another embodiment, a system for automatic dispatch of work assignments to tow service providers comprises an auto dispatch application implemented on one or more processors of a user device. The auto dispatch application configured to: provide a user interface for entering a work assignment request by a user of the user device, the user being a tow service provider; in response to input provided via the user interface by the user of the user device, generate a work assignment request message requesting work assignment for fulfillment by the tow service provider, and cause the user device to transmit the work assignment request message, via a network, to an enterprise server device. The system further comprises an auto dispatch system implemented on one or more processors of the enterprise server device. The auto dispatch system configured to: receive the work assignment request message transmitted by the user device; select, from a set of pending tow request stocks, an initial pool of tow request stocks for potential fulfillment by the tow service provider; generate, based on the initial pool of tow request stocks, a refined pool of tow request stocks, the refined pool of tow request stocks being generated to exclude, from the initial pool of tow request stocks, tow request stocks for which the tow service provider does not meet at least one fulfillment requirement; generate, based on the refined pool of tow request stocks, an optimized pool of tow request stocks to include one or more tow request stocks selected, according to one or more optimization criteria, from the refined pool of tow request stocks; generate one or more work assignment response messages to include information assigning tow request stocks in the optimized pool to the tow service provider; and cause the one or more work assignment response messages to be transmitted from the enterprise server device to the user device to provide the information assigning the tow request stocks in the optimized pool of tow request stocks to the user device. Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description.

BRIEF DESCRIPTION OF THE DRAWINGS

For a more complete understanding of the invention, needs satisfied thereby, and the objects, features, and advantages thereof, reference now is made to the following description taken in connection with the accompanying drawings.

FIG. 7 is a flow chart of a method for dispatching work assignments to tow service providers, according to an embodiment.

Figure 1:
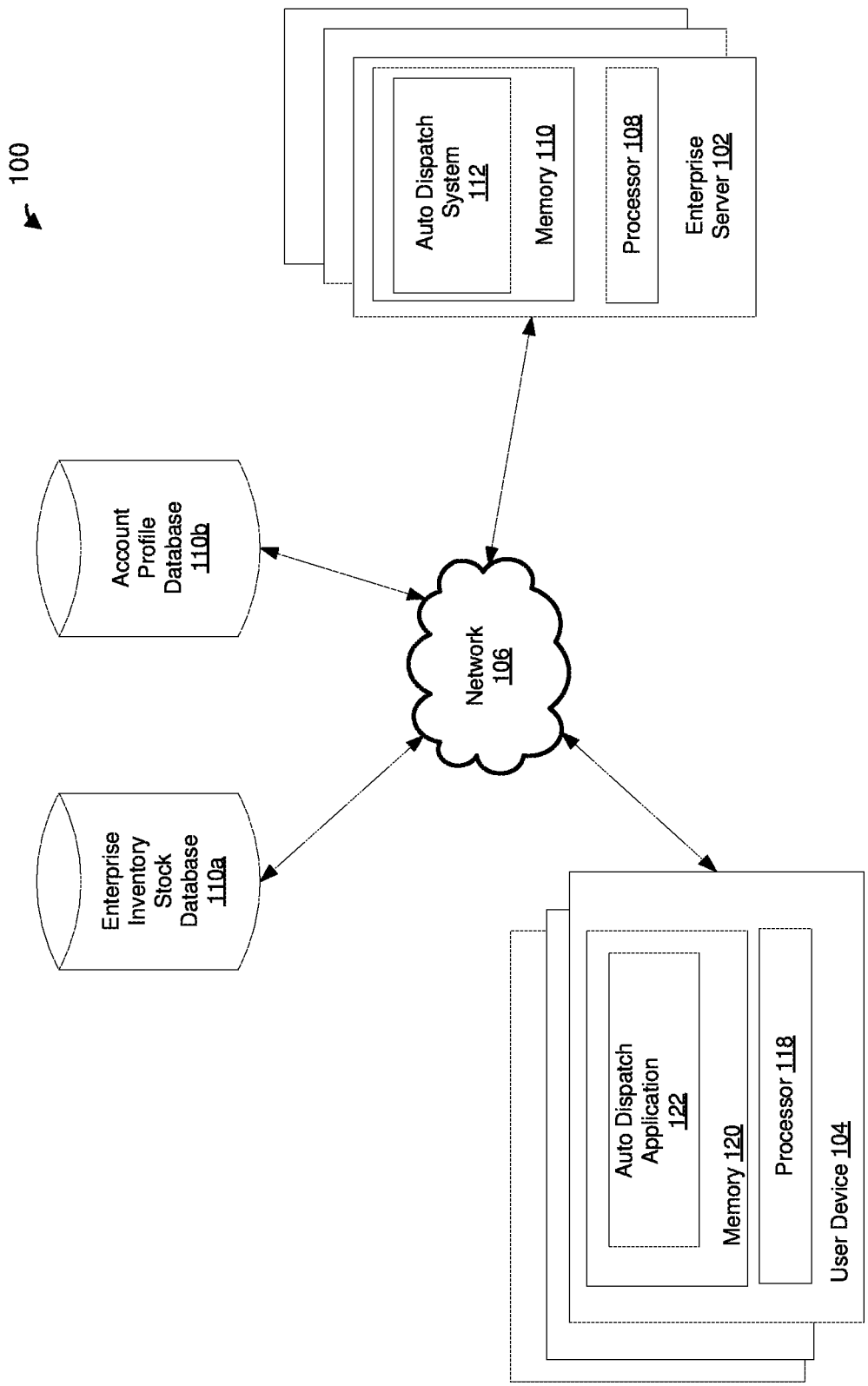
FIG. 1 is a block diagram of a system in which automatic dispatch techniques described herein may be utilized, according to an embodiment.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Embodiments described herein generally relate to an automatic dispatch system that automatically services work assignment requests that the automatic dispatch system may receive from tow service providers, such as tow truck drivers, for example. The automatic dispatch system may be implemented by a server of an automotive market place enterprise, such as a car auction enterprise, that may partner with insurance providers and may facilitate pickup of damaged vehicles that, for example, may be declared as non-repair vehicles by the insurance providers. The automatic dispatch system may receive work assignment requests provided by tow service providers via user devices, such as cellular phones, of the tow service providers. In response to receiving a work assignment request from a user device of a tow service provider, the automatic dispatch system may select, from an inventory of pending tow request stocks corresponding to tow requests provided by insurance providers, an initial pool of tow request stocks that may potentially be fulfilled by the tow service provider. Based on the initial pool of tow request stocks, the automatic dispatch system may generate a refined pool of tow request stocks to exclude, from the initial pool of tow request stocks, tow request stocks for which the tow service provider does not meet at least one fulfillment requirement. For example, the automatic dispatch application may generate the refined pool of tow request stocks exclude one or more of i) tow request stocks with pickup locations outside a distance boundary from a current location of the requesting tow service provider, ii) tow request stocks with pickups that require a license that is not held by the requesting tow service provider, iii) tow request stocks associated with specific insurance providers, for example if the tow service provider is not set up to work with the specific insurance providers, iv) tow request stocks that require payment methods not accepted by the requesting tow service provider, v) tow request stocks that require pickup capabilities (e.g., heavy duty vehicle pickup capabilities, number of axles, vehicle weight, flat bed, winch) not offered by the requesting tow service provider, etc.

The automatic dispatch system may further generate an optimized pool of tow request stocks to include one or more tow request stocks selected, according to one or more optimization criteria, from the refined pool of tow request stocks. The automatic dispatch application may select the one or more tow request stocks to be included in the optimized pool of tow request stocks, based, for example, on one or more of i) a current load of a tow truck of the requesting service provider, ii) destinations of vehicles currently on the tow truck of the requesting tow service provider, iii) current capacity of tow yards (e.g., auction yard) that may be potential destinations of the vehicles, iv) due times for pickups of the vehicles, etc.

The automatic dispatch system may generate a work assignment response message to include the optimized pool of tow request stocks that may potentially be fulfilled by the tow service provider, and may transmit the work assignment response message to the user device of the tow service provider to provide the optimized pool of tow request stocks for potential fulfillment by the tow service provider. The automatic dispatch system may allow the tow service provider to accept or reject respective ones of the tow request stocks assigned to the tow service provider. For example, the tow service provider may utilize the auto dispatch application running on a user device, such as a cellular phone of the tow service provider, to accept or reject the respective ones of the tow request stocks assigned to the tow service provider. The accepted work assignments may then be fulfilled by the tow service provider.

These and other techniques described herein allow efficient assignment of work assignments to tow service providers and may expedite fulfillment of the work assignments by the tow service providers. Such automatic work assignment may, for example, reduce delays in pickups of the damaged vehicles, allowing for efficient and quick clearing of spaces (e.g., roadways, parking spaces, etc.) that may be blocked by the damaged vehicles, and may also expedite processing of insurance claims and provision of payments by insurance providers to the owners of the damaged vehicles. Such automatic work assignment may be of particular importance in catastrophe situations in which many vehicles may be damaged in a short span of time, for example due to fires, floods, tornadoes, hurricanes, etc. Such automatic work assignment may also be advantageous in the absence of catastrophic events.

FIG. 1 is a block diagram of a system 100 in which automatic dispatch techniques described herein may be utilized, according to an embodiment. The system 100 may include one or more enterprise servers 102 and one or more user devices 104, which may be communicatively coupled via a communication network 106. The communication network 106 may be a wide area network (WAN) such as the Internet, a local area network (LAN), or any other suitable type of communication network. In some embodiments, communication network 106 may be a single communication network or may be made up of multiple different communication networks. The system 100 may also include one or more databases 110, including an enterprise inventory stock database 110a and an account profile database 110b (described below). The one or more databases 110 may be communicatively coupled to the enterprise server 102 via the communication network 106, as illustrated in FIG. 1, or may be coupled to the enterprise server 102 in other suitable manners. For example, the one or more databases 110 may be directly connected to the enterprise server 102, or may be included as part of the enterprise server 102, in some embodiments. Although the system 100 is illustrated as including two databases 110, the system 100 may include more than two databases 110, or may include a single database 110, in some embodiments. For example, the enterprise inventory stock database 110a and the account profile database 110b may be parts of a single database 110, in an embodiment.

The enterprise servers 102 may be utilized by an automotive market place enterprise, such as a car auction enterprise, and may implement one or more applications that facilitate operation of the automotive market place enterprise. In an embodiment, respective ones of the enterprise servers 102 may be utilized by respective branch locations of the automotive market place enterprise, and each of the enterprise servers 102 may facilitate operations of the respective ones of the branch locations the automotive market place enterprise. In other embodiments, an enterprise server 102 may be utilized by multiple branch locations of the automotive market place enterprise, and may facilitate operation across multiple branch locations the automotive market place enterprise.

An enterprise server 102 may include a processor 108 and a computer-readable memory 110 that stores an automatic dispatch system 112 (sometimes referred to herein as "auto dispatch system" 112) in the form of computer-readable instructions, for example, that may be executable by the processor 108. Computer readable memory 110 may include volatile memory to store computer instructions and data on which the computer instructions operate at runtime (e.g., Random Access Memory or RAM) and, in an embodiment, persistent memory such as a hard disk, for example. The automatic dispatch system 112 may facilitate automatic dispatch of work assignments that may be requested by tow service providers via user devices 104 and communication network 106.

The user devices 104 may include, for example, personal computers, laptop computers, notebook computers, tablet computers, cellular phones, smart phones, and other suitable devices that may be configured for communication over a communication network. A user device 104 may include a processor 118 and a computer readable memory 120 that stores computer readable instructions executable by the processor 110. The computer readable memory 120 may store an automatic dispatch application 122 (sometimes referred to herein as "auto dispatch application" 122). The computer readable memory 120 may include volatile memory to store computer instructions, such as Random Access Memory (RAM), and may also include persistent memory such as a hard disk, for example. In some embodiments, the user device 104 includes multiple processors 118. Further, in some embodiments, the auto dispatch application 122 may be implemented using hardware components, firmware components, software components, or any combination thereof.

The auto dispatch application 122 of the user device 104 may be utilized by a tow service provider, such as a tow truck driver, to electronically request work assignments to be provided for fulfillment by the tow service provider. The tow service provider may be tow company personnel, such as a tow truck driver employed by the tow company, or may be an independent tow truck driver, for example. For ease of explanation, the user of the user device 104 is sometimes referred to herein as a tow truck driver, and work assignment requests provided via the auto dispatch application 122 of the user device 104 are generally described herein as requesting assignment of work to be fulfilled using a tow truck of the tow truck driver. In other embodiments, however, work assignment requests may be provided via the auto dispatch application 122 of the user device 104 by a person other than a tow truck driver and/or may request assignment of tow work to be fulfilled using multiple tow trucks. For example, work assignment requests may be provided via the auto dispatch application 122 of the user device 104 by personnel of a tow company and/or may request assignment of tow work to be fulfilled using multiple tow trucks of the tow company.

The auto dispatch application 122 may provide a user interface that may allow the tow truck driver to request work to be assigned for fulfillment by a tow track of the tow truck driver. The tow service provider may enter, into the user interface of the auto dispatch application 122, request information that may facilitate automatic dispatch of the requested work assignments to the tow truck driver. For example, the tow truck driver may enter, via the user interface of the auto dispatch application 122, information indicating a current load of the tow truck of the tow truck driver, a number pickups being requested for fulfillment by the tow truck driver, desired pickup locations or areas, desired drop off location or areas, etc. The auto dispatch application 122 may generate a work assignment request message based on the information entered via the user interface by the tow truck driver, and may cause the work assignment request message to be transmitted to the enterprise server 102. The work assignment request message may include an identification of the tow truck driver and/or of the tow truck for which work assignment is being requested by the tow truck driver. The work assignment request message may additionally include the information entered via the user interface by the tow truck driver.

The enterprise server 102 may receive work assignment request messages from the user devices 104, and may provide the work assignment request messages to the auto dispatch system 112. The auto dispatch system 112 may process the work assignment request messages, and may automatically assign, based at least in part on information included in the work assignment request messages, tow request stocks for fulfillment by the tow service provider (e.g., by the tow truck of the tow service provider). To service a work assignment request received from a user device 104 of a tow truck driver, the auto dispatch system 112 may select an initial pool of tow request stocks from a database of pending tow request stocks that may be maintained in the enterprise inventory stock database 110a, for example. The auto dispatch system 112 may perform one or more refinements and/or optimizations of the initial pool of tow request stocks, and may generate a refined and/or optimized pool of tow request stocks. The auto dispatch system 112 may generate a work assignment response message to include the refined and/or optimized pool of tow request stocks, and may cause the work assignment response message to be transmitted from the enterprise server 112 to the user device 104 to provide the refined and/or optimized pool of tow request stocks for potential fulfillment by the tow truck driver.

The enterprise server 102 may maintain, for example in the enterprise inventory stock database 110a, a database of tow request stocks. The database of tow request stocks in the enterprise inventory stock database 110a may include a set of tow request stocks corresponding to tow requests provided by one or more insurance providers requesting pickup of damaged vehicles, such as for example vehicle that may have been declared as "non-repair" or totaled by the insurance providers. The set of tow request stocks may, in turn, include respective subsets of tow request stocks corresponding to tow requests provided by different ones of multiple insurance providers. For example, the enterprise inventory stock database 110a may include a first subset of tow request stocks corresponding to tow requests provided by a first insurance provider (e.g., Geico), a second subset of tow request stocks corresponding to tow requests provided by a second insurance provider (e.g., State Farm), a third set of tow request stocks corresponding to tow requests provided by a third insurance provider (e.g., Allstate), etc. A tow request stock in the enterprise inventory stock database 110a may include tow request information, such as the particular insurance provider requesting the pickup, a geographical location of the pickup, license requirements for the pickup, a type of vehicle that is to be picked up, one or more specific payment types that may be provided for the pickup, etc. In some embodiments, at least some of the tow request stocks correspond to tow requests provided by a vehicle provider other than an insurance company, for example, a charity group, private owner, or any other suitable entity that may want to auction a vehicle. For ease of description, the examples described herein refer to the insurance company as the vehicle provider.

The enterprise server 102 may also maintain, for example in the accounts database 110b, a database of contracts between the automotive market place enterprise and the insurance providers, including, for example, service level agreements (SLAs) between the automotive market place enterprise and the insurance providers. A service level agreement between the automotive market place enterprise and an insurance provider may include various agreed upon requirements, such as a minimum daily number of tow requests to be handled for the insurance provider by the automotive market place enterprise, a time of fulfillment of tow requests, such as same day fulfillment of tow requests with pickup locations within a certain distance (e.g., 30 miles) from a branch location of the automotive market place enterprise, same day fulfillment with pickup locations within a certain distance (e.g., 100 miles) if the tow requests are received by a certain time (e.g., 9 AM), a maximum time (e.g., a maximum number of days) to fulfill a tow request, etc., in various embodiments.

The enterprise server 102 may additionally maintain, for example in the accounts database 110b, a database of profiles of tow service providers that may be registered with the automotive market place enterprise. A tow service provider profile may include an identifier associated with the tow service provider, and may include additional information about the tow service provider, such as geographical area serviced by the tow service provider, whether particular licenses (e.g., residential pickup license, business pickup license, towing requirement or regulation from a local zoning body) are held by the tow service provider, a type of tow truck of the tow service provider, maximum capacity of the tow truck of the tow service provider, pickup capabilities of the tow service provider (e.g., whether the tow service provider can handle certain types of vehicles, such as heavy duty vehicles, whether they provide a desired number of axles, vehicle weight, flat bed, winch), payment types accepted by the tow service provider, etc.

The auto dispatch system 112 may generally service work assignment request messages received from the user devices 104 of tow service providers by efficiently and optimally assigning tow request stocks pending in the enterprise inventory database 110a for fulfillment by the tow service providers. In an embodiment, the auto dispatch system 112 may service a work assignment request message received from a user device 104 of a tow service provider based on i) information included in a tow provider profile that may be retrieved from the account profile database 110b using an identifier of the tow service provider that may be included in the work assignment request message and ii) tow request information that included in tow request stocks in the enterprise inventory database 110*a*.

To service a work assignment request message received from a user device 104 of a tow service provider, the auto dispatch system 112 may select, from a set of tow request stocks pending in the enterprise inventory stock database 110*a*, an initial pool of tow request stocks for potential fulfillment by the tow service provider. The auto dispatch system 112 may select the initial pool of tow request stocks based on the geographical service area of the tow service provider, for example as indicated in a tow provider profile of the tow service provider. For example, the auto dispatch system 112 may select the initial pool of tow request stocks to include tow request stocks with pickup locations within the geographical service area of the tow service provider. In other embodiments, the auto dispatch system 112 may select the initial pool of tow request stocks according to a suitable selection criteria different from the geographical service area of the tow service provider. The auto dispatch system 112 may then apply one or more refinement and/or optimization criteria to the initial pool of tow request stocks to refine and/or optimize the initial pool of tow request stocks.

Refining the initial pool of tow request stocks may involve excluding, from the initial pool of tow request stocks, one or more tow request stocks for which the tow service provider does not meet at least one fulfillment requirement. As an example, if the tow provider profile of the tow service provider indicates that the tow service provider does not hold a particular towing license (e.g., residential pickup license, business pickup license, towing requirement or regulation from a local zoning body), the auto dispatch system 112 may exclude, from the initial pool of tow request stocks, tow request stocks that require the particular towing license. As just another example, if the tow provider profile of the tow service provider indicates that the tow service provider does not accept a particular type of payment (e.g., credit card payments), the auto dispatch system 112 may exclude, from the initial pool of tow request stocks, tow request stocks that require the particular type of payment. As yet another example, if the tow provider profile of the tow service provider indicates that the tow service provider does not handle a particular type of vehicle or does not have certain pickup features (e.g., whether the tow service provider can handle certain types of vehicles, such as heavy duty vehicles, whether they provide a desired number of axles, vehicle weight, flat bed, winch), the auto dispatch system 112 may remove, from the initial pool of tow request stocks, tow request stocks that request pickup of the particular type of vehicle. In other embodiments, other suitable refinement criteria may be additionally or alternatively utilized. An example process for refining a pool of tow request stocks, according to an embodiment, is described in more detail below in connection with FIGS. 5A-B.

The auto dispatch system 112 may further optimize the refined pool of tow request stocks, by applying one or more optimization criteria to the refined pool of tow request stocks to select an optimized pool of tow request stocks. The auto dispatch system 112 may select the optimized pool of tow request stocks based on one or more of i) a current load of the tow truck for which work assignment is requested, ii) a maximum load of the tow truck for which work assignment is requested, iii) a current location of the tow truck for which work assignment is requested, iv) destination locations of vehicles in the current load of the tow truck for which work assignment is requested, v) destination locations of vehicles in the tow request stocks, iv) pickup locations in the tow request stocks relative to the current location of the tow truck of the tow service provider, vii) pickup locations in the tow request stocks relative to each other, vi) priorities of and service level agreements with the insurance providers that provided the tow requests in the tow request stocks, etc. As an example, the auto dispatch system 112 may select multiple tow request stocks with a same destination location (e.g., a same yard), and may generate the optimized pool of tow request stocks to include the multiple tow request stocks with the same destination location. As another example, the auto dispatch system 112 may generate the optimized pool of stocks to include multiple tow request stocks with close pickup locations relative to each other and/or close pickup locations relative the current location of the tow truck. As yet another example, the optimized pool of tow request stocks to include tow request stocks having earlier pickup due times and/or tow request stocks that need to be services to progress to achieving SLA requirements for a particular insurance provider. In other embodiments, other suitable optimization criteria may be utilized. An example process for optimizing a pool of tow request stocks, according to an embodiment, is described in more detail below in connection with FIG. 6.

In some embodiments, the auto dispatch system 112 may refine and/or optimize the initial pool of tow request stocks using different refinement and/or optimization criteria based on whether the tow service provider (e.g., the tow truck driver) is working to fulfill catastrophe relief assignments or regular day-to-day assignments. For example, the auto dispatch system 112 may utilize relaxed and/or different optimization criteria when assigning work to tow truck drivers working to fulfill catastrophe relief assignments relative to optimization criteria used when assigning work to tow truck drivers working to fulfill regular day-to-day assignments. As an example, optimizations based on insurance provider priority and/or SLA requirements when assigning work to tow truck drivers working to fulfill catastrophe relief assignments. On the other hand, optimizations based on pickup locations and/or drop-off locations may be performed to facilitate efficient and quick pickup of large number of vehicles that may be damaged in a short span of time in a catastrophe situation.

In some embodiments, the auto dispatch system 112 accumulates multiple work assignment requests received from respective user devices 104 (e.g., one request per user device), for example by queueing the multiple work assignment requests received from user devices 104, to more efficiently select and service ones of the multiple work assignment requests received from user devices 104. For example, the auto dispatch system 112 may perform optimizations across multiple work assignment requests received from user devices 104 to more optimally distribute assignment of pending tow request stocks across multiple requesting tow service providers. Such optimal distributions of assignments of pending tow request stocks across multiple requesting tow service providers may be particularly important in catastrophe work assignment scenarios, but may also be utilized to more optimally distribute assignment of pending tow request stocks in regular day-to-day work assignment scenarios. In some embodiments, the auto dispatch system 112 allows for only a single pending request from a user device 104, for example, by ignoring or discarding subsequent requests received from a same user device 104, or replacing an earlier request with a most recent request.

Referring still to FIG. 1, upon generating the refined and/or optimized pool of tow request stocks, the auto dispatch system 112 may generate one or more work assignment response messages, and may cause the one or more work assignment response messages to be transmitted from the enterprise server 112 to the user device 104 to provide information assigning the refined and/or optimized pool of tow request stocks for potential fulfillment by the user (e.g., the tow truck driver) of the user device 104. The user device 104 may receive the work response message from the enterprise server 102, and may provide the work response message to the auto dispatch application 122. The user interface of the auto dispatch application 122 may display the tow request stocks assigned to the tow truck driver. The user interface of the auto dispatch application 122 may allow the user to accept or reject respective ones of the tow request stocks assigned to the user. The user may reject particular tow request stocks when the tow request stocks assigned to the user are initially presented to the user, or may reject initially accepted tow request stocks, for example because the user could not fulfill, or could not timely fulfill, the initially accepted tow request stocks. As just an example, the user may reject an initially accepted tow request stock because the vehicle indicated in the tow request stocks was totaled (e.g., broken apart) to an extent that deemed it difficult or impossible to be loaded onto the tow truck of the user. The auto dispatch application 122 may generate one or more acceptance/rejection messages based on the input provided by the user via the user interface of the auto dispatch application 122, and may cause the one or more acceptance/rejection messages to be transmitted to the enterprise server 102 to indicate accepted/rejected tow request stocks to the auto dispatch system 112 for another component of the enterprise server 102, in an embodiment.

In an embodiment, the auto dispatch application 122 may additionally allow the user to provide status of fulfillment of the accepted tow request stocks assigned to the user. For example, upon completing pickup of a vehicle indicated in a tow request that was accepted by the user, the user may enter, via the user interface of the auto dispatch application 122, a status update indicating that the vehicle has been picked up. Similarly, upon completing drop-off of a vehicle indicated in a tow request accepted by the user, the user may enter, via the user interface of the auto dispatch application 122, a status update indicating that the vehicle has been transported to the desired location. The auto dispatch application 122 may generate one or more status update messages based on the input provided by the user via the user interface of the auto dispatch application 122, and may cause the one or more status update messages to be transmitted to the enterprise server 102 to indicate the status updates to the auto dispatch system 112 or another component of the enterprise server 102, in an embodiment.

In some embodiments, the auto dispatch application 122 may allow the user to request reimbursement of charges that may be incurred by the user, for example during pick-up, transportation and/or drop-off of a vehicle. As an example, in a situation in which the pick-up location of the vehicle is a storage yard, a payment may need to be provided upon pick-up of the vehicle from the storage yard. In this case, the user may provide the payment to the storage yard when picking up the vehicle from the storage yard. As another example, the user may provide a payment to a tree removal company for removal of a tree that may have fallen on the vehicle being picked-up, may provide a toll payment during transportation of the vehicle, etc. The user may submit a reimbursement request, requesting a refund of one or more charges incurred by the user, via the auto dispatch application 122. Submitting the request may involve entering, into the user interface of the auto dispatch application 122, various information about one or more payments for which reimbursement is being requested, such as specifying a location at which a payment was made, entering an amount (e.g., a dollar amount) for which the refund is being requested, providing a receipt (e.g., a picture of the receipt) obtained for the payment, etc. The auto dispatch application 122 may generate one or more reimbursement request messages based on the input provided by the user via the user interface of the auto dispatch application 122, and may cause the one or more reimbursement request messages to be transmitted to the enterprise server 102 to provide the reimbursement request to the auto dispatch system 112 or another component of the enterprise server 102, in an embodiment. The auto dispatch system 112 or another component of the enterprise server 102 may receive and process the one or more reimbursement request messages, and may automatically issue a refund to the user, for example by crediting an account of the user, issuing a check to be mailed to the user, etc., in an embodiment.

Additionally or alternatively, the auto dispatch application 122 may allow the user to use electronic payment means to provide payments for charges, such as storage yard charges, tree removal charges, toll charges, etc., incurred during pick-up, transportation and/or drop-off of a vehicle. For example, in an embodiment, the auto dispatch application 122 may allow the user to request that electronic payment means, such as a virtual credit card (e.g., a one-time use virtual credit card) or other virtual payment means, to be issued for a charge incurred during pick-up, transportation and/or drop-off of a vehicle. The user may submit an electronic payment means issuance request, requesting issuance of an electronic payment means, via the auto dispatch application 122. Submitting the electronic payment means issuance request may involve entering, into the user interface of the auto dispatch application 122, various information about the payment for which the electronic payment means is being requested, such as specifying a location at which a payment is to be made, entering an amount (e.g., a dollar amount) for which the electronic payment is to be issued, providing an invoice (e.g., a picture of the invoice) obtained for the payment, etc. The auto dispatch application 122 may generate one or more electronic payment means issuance request messages based on the input provided by the user via the user interface of the auto dispatch application 122, and may cause the one or more electronic payment means issuance request messages to be transmitted to the enterprise server 102 to provide the electronic payment means issuance requests to the auto dispatch system 112 or another component of the enterprise server 102, in an embodiment. The auto dispatch system 112 or the other component of the enterprise server 102 may receive and process the one or more electronic payment means issuance request messages, and may request for the payment means to be issued by a financial institution such as a bank or a credit company with which the automotive market place enterprise may have an account, in an embodiment. For example, the auto dispatch system 112 or the other component of the enterprise server 102 may generate an electronic payment issuance request message for issuance of an electronic payment means, and may transmit the electronic payment issuance request message to a server of the financial institution (not shown in FIG. 1), for example via an application programming interface (API) provided by the financial institution. The electronic payment issuance request message may include various information that may be needed by the financial server to issue the electronic payment means, such as an amount for which to issue the electronic payment means, account information (e.g., an account number) associated with an account of the automotive market place enterprise against which the electronic payment means is to be issued, etc. In some embodiments, the auto dispatch application 122 of the user device 104 may generate and transmit an electronic payment issuance request message directly to the financial institution, via an API provided by the financial institution. In an embodiment, the auto dispatch application 122 may be programmed with or otherwise have access to account information, such as an account number associated with an account of the automotive market place enterprise against which the electronic payment means is to be issued, and the auto dispatch application 122 may include, in the electronic payment issuance request message, the account information associated with the account of the automotive market place enterprise.

The server of the financial institution may receive the electronic payment issuance request (e.g., from the enterprise server 102 or the user device 104), and may generate electronic payment means information, such as a virtual credit card number, expiration date, etc., to service the request. The electronic payment means may be generated by the server of the financial institution in connection with the account of the automotive market place enterprise, so that the requested funds may be drawn directly from and/or posted directly to the account of the automotive market place enterprise. The server of the financial institution may generate and transmit a response message to the enterprise server 102 or to the user device 104, to provide the electronic payment means information to the enterprise server 102 or the user device 104, in an embodiment. In an embodiment in which the financial institution transmits the response message to the enterprise server 102, the enterprise server 102 (e.g., the auto dispatch system 112) may, in turn, provide the electronic payment means information, such as the virtual credit card number, the expiration date, etc., to the user via the auto dispatch application 122 to enable the user to provide payment for the incurred charge using the electronic payment means. Issuance of electronic payment means to the user via the auto dispatch application 122 eliminates the need for subsequent reimbursements to be provided to the user, in at least some situations. Further, issuance of electronic payments to the user via the auto dispatch application 122 allows for payments to be made directly by the automotive market place enterprise which may be advantageous, for example, in situations in which the payment recipient, such as a storage yard, only accepts payments made on behalf of the automotive market place enterprise directly from the automotive market place enterprise, or only accepts payment types that the user may not be able to otherwise provide, in some embodiments.

Figure 2:
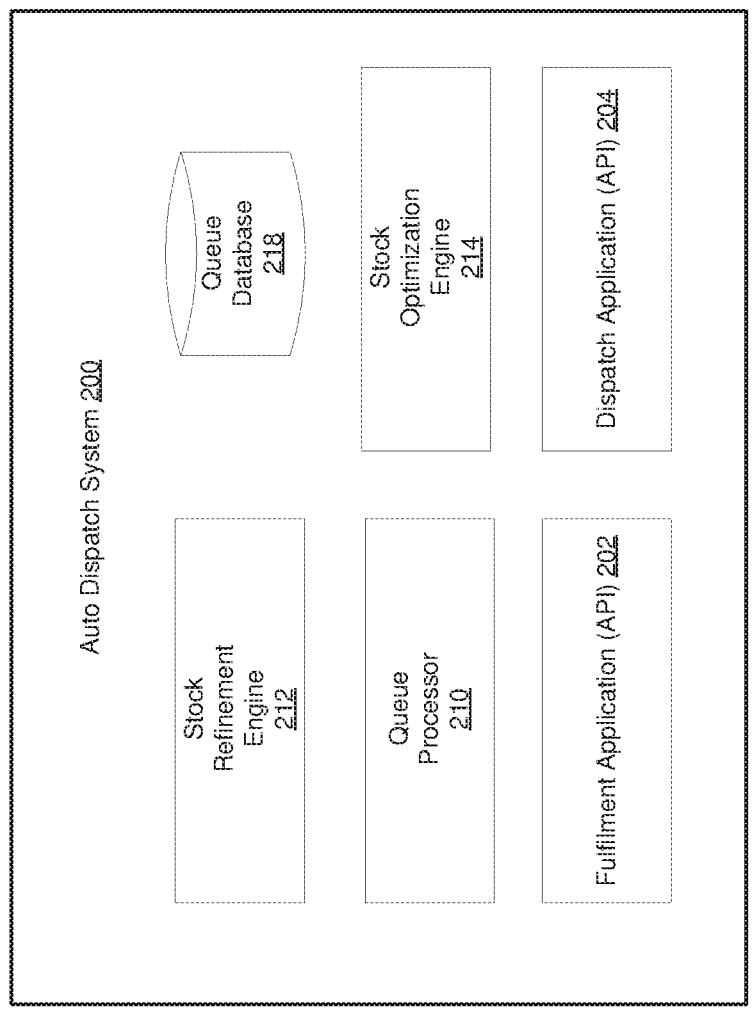
FIG. 2 is a block diagram of an auto dispatch system used with the system of FIG. 1, according to an embodiment.

FIG. 2 is a block diagram of an auto dispatch system 200 that corresponds to the auto dispatch system 112 of FIG. 1, according to an embodiment. In the embodiment of FIG. 2, the auto dispatch system 112 a fulfillment application 204 and a dispatch application 206. The auto dispatch system 112 a fulfillment application 204 and a dispatch application 206 may provide, respectively, input and output interfaces for the auto dispatch system 112, and may be application programming interfaces (APIs) or other suitable types of interfaces. The auto dispatch system 112 additionally includes a queue processor 210, a refinement engine 212, an optimization engine 214 and a queue database 218. In some embodiments, the auto dispatch system 112 may omit one or more of the queue processor 210, the refinement engine 212, the optimization engine 214, and the queue database 218. For example, the auto dispatch system 112 may omit the queue processor 210 and the queue database 218, in some embodiments. In an embodiment, work assignment requests received by the auto dispatch system 112 from user devices 104 may be initially processed (e.g., validated) by the fulfillment application 204, and may be queued in the queue database 218 by the fulfillment application 204. The work assignment requests may be retrieved from the queue database 218 by the queue processor 140, and may be further processed by the queue processor 140.

To process a work assignment request, the queue processor 140 may generate an initial pool of tow request stocks for potential fulfilment by the tow service provider (e.g., a tow truck driver) from which the work assignment request was received by the auto dispatch system 112. The initial pool of tow request stocks may then be refined by the refinement engine 212 and/or optimized by the optimization engine 214. The refined and/or optimized tow request pool may be provided to the dispatch application 204. The dispatch application 204 may perform financial calculations, document generation, etc., to prepare dispatch of the refined and/or optimized tow request pool to the user device 104. The dispatch application 204 may generate one or more work assignment response messages to include information assigning tow requests in the tow request pool refined by the refinement engine 212 and/or optimized by the optimization engine 214 to the user (e.g., the tow truck driver) of the user device 104. The one or more work assignment response messages may also include information generated by the dispatch application 204, such as financial information, documentation, etc., that may be needed for fulfillment of the tow request stocks assigned to the user of the user device 104.

Figure 3:
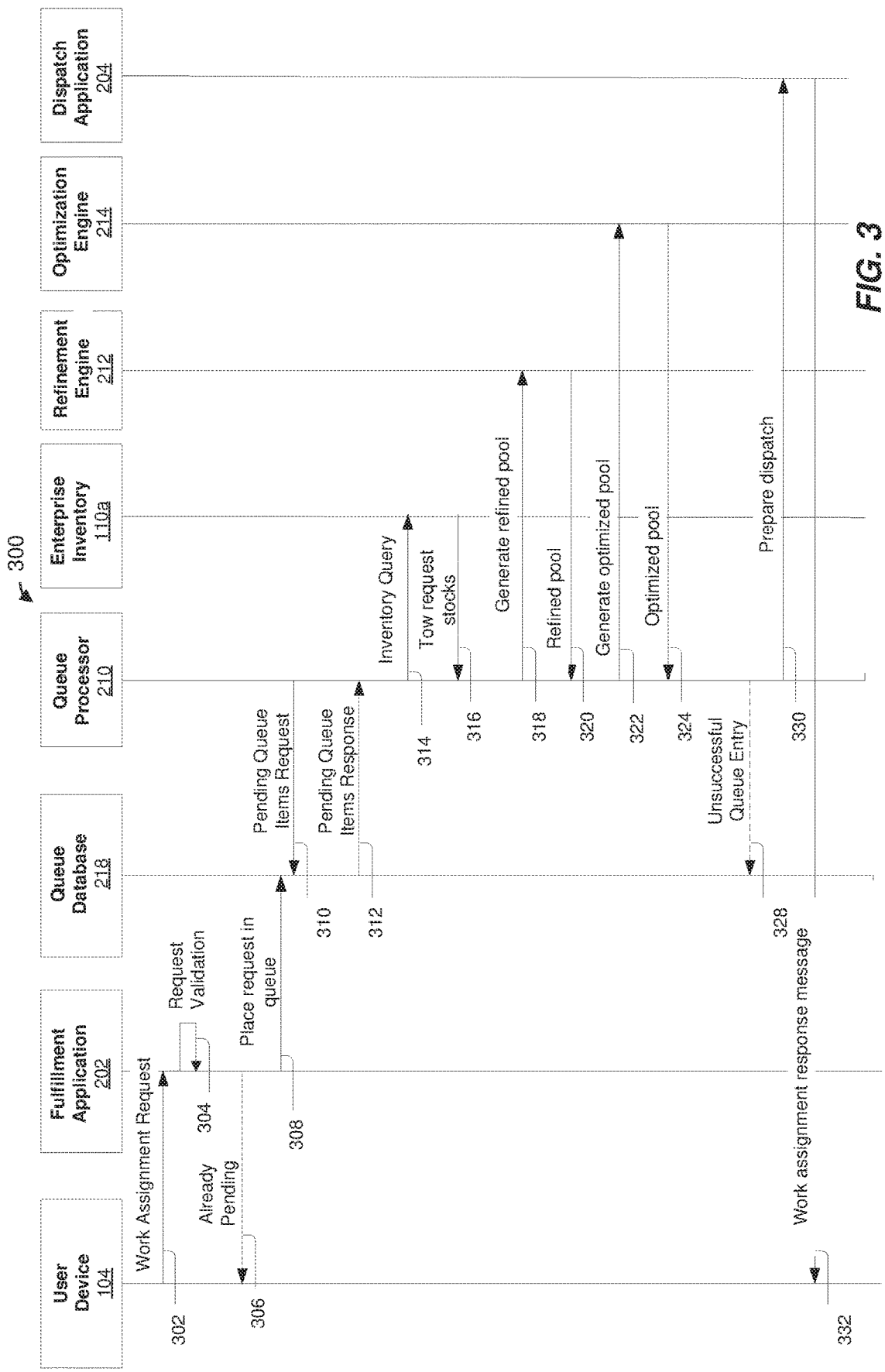
FIG. 3 is a diagram illustrating a dispatch process implemented by an auto dispatch system used with the system of FIG. 1, according to an embodiment.

FIG. 3 is a diagram illustrating a dispatch process 300 that may be implemented by the auto dispatch system 200 of FIG. 2, according to an embodiment. The auto dispatch system 200 may receive a work assignment request message 302 from a user device 104. The work assignment request message 302 may be generated by the auto dispatch application 122 of the user device 104 in response to a user input provided, via a user interface of the auto dispatch application 122, by a tow service provider (e.g., a tow truck driver). The work assignment request message 302 may include an identification of the tow service provider. The work assignment message 302 may also include request information, such as a current load of the tow truck, a number of vehicles being requested, a desired geographical area for pickup locations and/or drop off locations, etc.

The work assignment request message 302 may be provided to the fulfillment application 202. The fulfillment application 202 may perform a validation procedure 304. The validation procedure 304 may check whether a work assignment request previously received from the tow service provider identified in the work assignment message 302 is currently pending in the auto dispatch system 200, for example. If the validation procedure 304 determines that the work assignment request 302 is not valid, for example because a previously received work assignment request from the tow service provider identified in the work assignment request message 302 is currently pending in the auto dispatch system 200, then the fulfilment application 202 may generate and transmit an error message 304 to the user device 104. The error message 304 may include an indication that the work assignment message 302 is not valid due to a pending work assignment request of the tow service provider. On the other hand, if the validation procedure 304 determines that the work assignment request 302 is valid, the fulfillment application 204 may place the work assignment request 302 in a queue in the queue database 218.

The queue processor 210 may periodically generate queue item requests 310 to retrieve pending work assignment requests from the queue database 228, and may receive pending work assignment requests 312 from the queue database 228 providing pending work assignment requests to the queue processor 210. For example, the queue processor 210 may receive an oldest currently pending work assignment request from the queue database 228, or may receive a work assignment request selected from the queue database 228 according to another suitable criteria. The work assignment request 312 may include a tow service provider identifier identifying a tow service provider that provided the work assignment request, and may include addition request information that was provided with the request by the tow service provider. In response to receiving a work assignment request 312, the queue processor 210 may obtain additional information that may be needed for servicing the request. For example, the queue processor 210 may retrieve, based on the tow service provider identifier included in the work assignment request 312, a profile of the tow service provider from the account database 110b, where the profile of the tow service provider may include various information regarding the tow service provider, such as geographical area serviced by the tow service provider, whether particular licenses (e.g., residential pickup license, business pickup license, towing requirement or regulation from a local zoning body) are held by the tow service provider, a type of tow truck of the tow service provider, maximum capacity of the tow truck of the tow service provider, pickup capabilities of the tow service provider (e.g., whether the tow service provider can handle certain types of vehicles, such as heavy duty vehicles, whether they provide a desired number of axles, vehicle weight, flat bed, winch), payment types accepted by the tow service provider, etc.

The queue processor 210 may generate an inventory query 314, and may provide the inventory query 314 to the inventory database 110a to select an initial pool of tow request stocks from a set of tow request stocks in the inventory database 110a. The inventory query 314 may select the initial pool of tow request stocks based, for example, on a geographical service area of the tow service provider, or may select the initial pool of tow requests based on other suitable selection criteria. In response to the inventory query 314, the queue processor 210 may receive an initial pool of tow request stocks 316 selected from the set of tow request stocks in the inventory database 110a.

With continued reference to FIG. 3, the queue processor 210 may generate an instruction 318, and may provide the instruction 318 to the refinement engine 212 to trigger the refinement engine 212 to generate a refined pool of tow request stocks based on the initial pool of tow request stocks 316. The refinement engine 212 may apply one or more refining criteria to the initial pool of tow request stocks 316 to generate a refined pool of stocks 320. For example, the refinement engine 212 may refine the initial pool of tow request stocks 316 to exclude one or more of i) tow request stocks with pickup locations outside a distance boundary from a current location of the tow service provider, ii) tow request stocks with pickups that require a license that is not held by the tow service provider, iii) tow request stocks associated with specific insurance providers, for example if the tow service provider is not set up to work with the specific insurance providers, iv) tow request stocks that require payment methods not handled by the tow service provider, v) tow request stocks that require pickup capabilities (e.g., whether the tow service provider can handle certain types of vehicles, such as heavy duty vehicles, whether they provide a desired number of axles, vehicle weight, flat bed, winch) not offered by the tow service provider, etc., in various embodiments.

Upon receiving the refined pool of tow request stocks 320, the queue processor 210 may generate an instruction 322, and may provide the instruction 322 to the optimization engine 214 to trigger the optimization engine 214 to generate an optimized pool of tow request stocks based on the refined pool of tow request stocks 320. The optimization engine 214 may apply one or more optimization criteria to the refined pool of tow request stocks 320 to generate an optimized pool of tow request stocks 322. For example, the optimization engine 214 may optimize the refined pool of tow request stocks 320 based on a current load of a tow truck of the requesting service provider, destinations of vehicles currently on the tow truck of the requesting tow service provider, current capacity of tow yards that may be destinations of the vehicles to be towed, stock priorities, requested pickup dates for the vehicle, etc., in various embodiments.

In an embodiment, different refinement and/or optimization criteria may be utilized by the refinement engine 212 and/or the optimization engine 214 depending on whether the tow service provider is working to fulfill catastrophe relief assignments or regular day-to-day assignments. In an embodiment, the queue processor 210 determines whether the tow service provider is working to fulfill catastrophe relief assignments or regular day-to-day assignments, and provides this information to the refinement engine 212 and/or the optimization engine 214 so that appropriate refinement and/or optimization criteria may be utilized.

Referring still to FIG. 3, upon receiving the optimized pool of tow request stocks 324, the queue processor 210 may check whether the received optimized pool of tow request stocks 324 is empty, indicating that no pending tow request stocks can currently be optimally assigned to the tow service provider. If the queue processor 210 determines that the optimized pool of tow request stocks 324 is empty, then the queue processor 210 may generate an unsuccessful queue entry signal 328, and may provide the unsuccessful queue entry signal 328 to the queue database 218, to mark the entry as unfulfilled in the queue database 218. The work assignment request may remain queued in the queue database 218, and the queue processor 210 may subsequently again attempt to service the request, in an embodiment.

On the other hand, if the queue processor 210 determines that the optimized pool of tow request stocks 324 is not empty, the queue processor 210 may generate an instruction 330, and may provide the instruction 330 to the dispatch application 204 to trigger dispatch of the optimized pool of tow request stocks 324 to the user device 104. The dispatch application 204 may prepare dispatch of the optimized pool of tow request stocks 324 to the user device 104. For example, the dispatch application 204 may perform financial calculations associated with fulfillment of tow request stocks in the optimized pool of tow request stocks 324, generate documents that may be needed for fulfillment of tow request stocks in the optimized pool of tow request stocks 324, etc. The dispatch application 204 may generate one or more work assignment response messages 332 that may include information assigning tow request stocks in the optimized pool of tow request stocks to 324 to the tow service provider. For example, the one or more work assignment response messages 332 may include the optimized pool of tow request stocks 324, and may include additional information (e.g., financial information, documents, etc.) that may be needed for fulfillment of tow request stocks in the optimized pool of tow request stocks 324. The dispatch application 204 may cause the one or more work assignment response messages 332 to be transmitted to the user device 104 to provide the information assigning tow request stocks in the optimized pool to the tow service provider.

Figure 4:
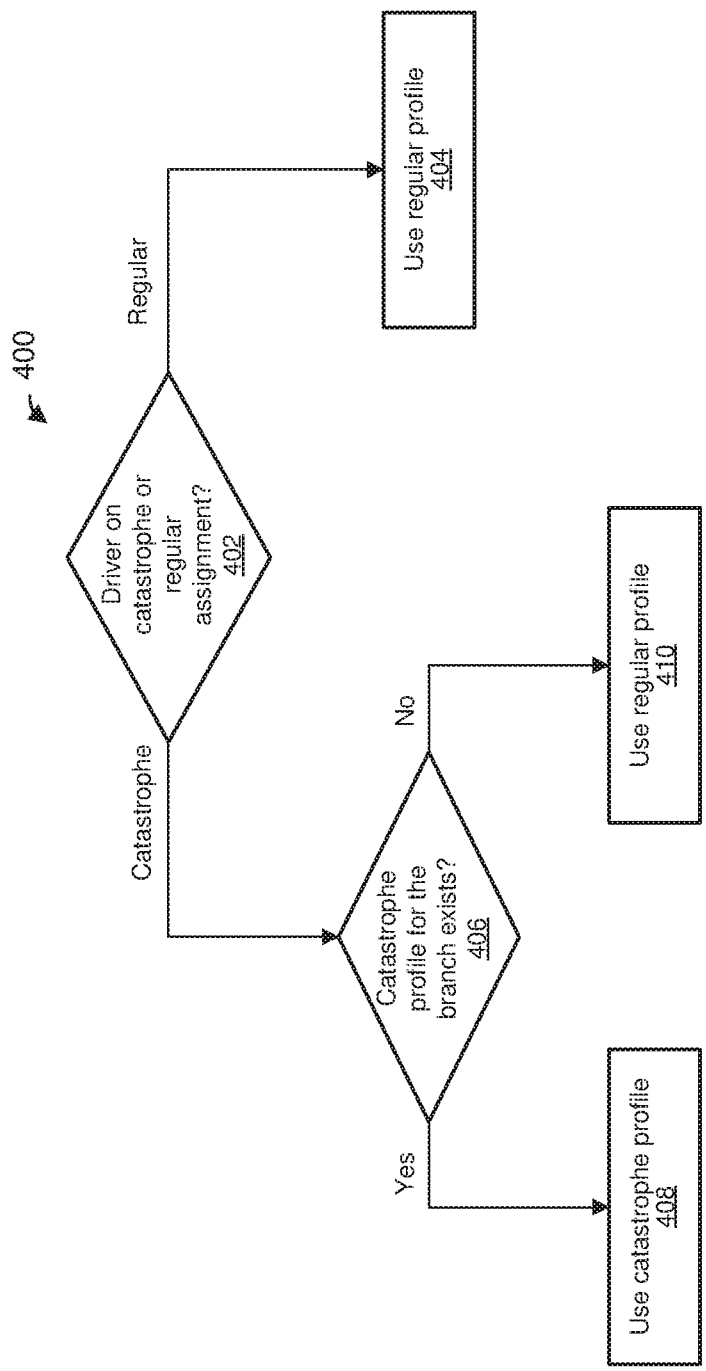
FIG. 4 is a diagram illustrating a process implement by an auto dispatch system used with the system of FIG. 1 to determine whether a catastrophe or a regular work assignment should be utilized to service a work assignment request, according to an according to an embodiment.

FIG. 4 is a diagram illustrating a process 400 that may be implement by the auto dispatch system 112 to determine whether a catastrophe or a regular work assignment should be utilized to service a work assignment request, according to an embodiment. The work assignment request may be received at an enterprise server 102 employed by a particular branch location of an automotive market place enterprise and may request work assignment from the particular branch location of the location of the automotive market place enterprise. In an embodiment, the queue processor 210 of the auto dispatch system 112 implements the process 400. In another embodiment, another suitable component of the auto dispatch system 112 implements the process 400.

At block 402, the queue processor 210 determines whether the tow service provider is working to fulfill catastrophe relief assignments or regular day-to-day assignments. The queue processor 210 may make this determination based on a work assignment indication in a tow service provider profile that the queue processor 210 may retrieve from the account profile database 110b. Additionally or alternatively, the queue processor 210 may make this determination based on information included in the work assignment request message received from the user device 104 of the tow service provider. In other embodiments, the queue processor 210 makes this determination based on other suitable information.

If the queue processor 210 determines at block 402 that the tow service provider is working to fulfill regular assignments, the process 400 continues at block 404 at which the queue processor 210 determines that regular assignment profile should be utilized. On the other hand, if the queue processor 210 determines at block 402 that the tow service provider is working to fulfill catastrophe relief assignments, the process 400 proceeds to block 406 at which the queue processor 210 determines whether a catastrophe assignment profile exists for the particular branch location of the automotive market place enterprise. If the queue processor 210 determines at block 406 that a catastrophe assignment profile exists for the particular branch location of the automotive market place enterprise, then the process 400 proceeds to block 408 at which the queue processor 210 determines that the catastrophe assignment profile should be utilized. On the other hand, if the queue processor 210 determines at block 406 that a catastrophe assignment profile does not exist for the particular branch location of the automotive market place enterprise, then the process 400 proceeds to block 410 at which the queue processor 210 determines that the regular assignment profile should be utilized.

Figure 5A:
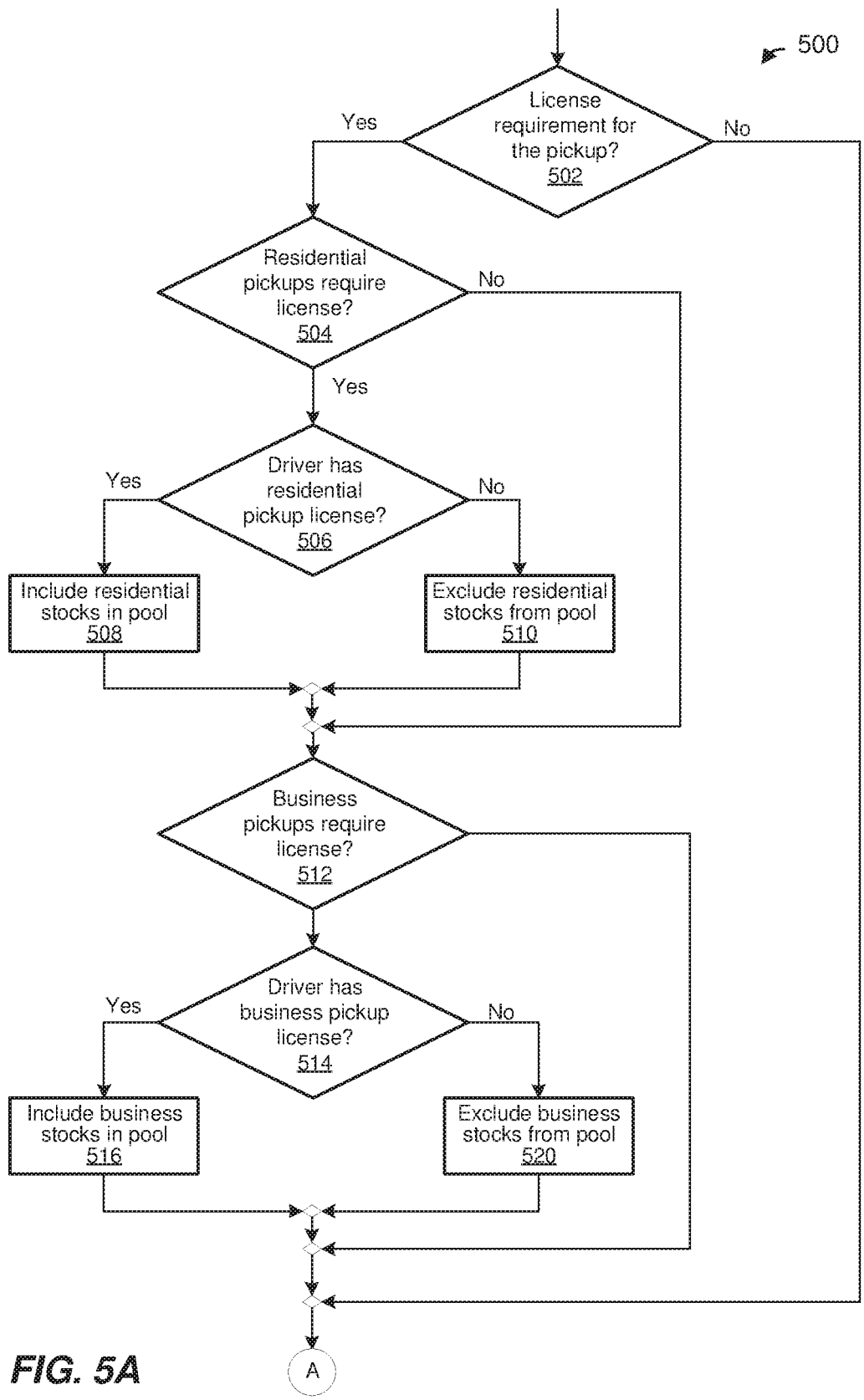
FIGS. 5A-B are diagrams illustrating a process implemented by an auto dispatch system used with the system of FIG. 1 to refine an initial pool of tow request stocks, according to an embodiment.
Figure 5B:
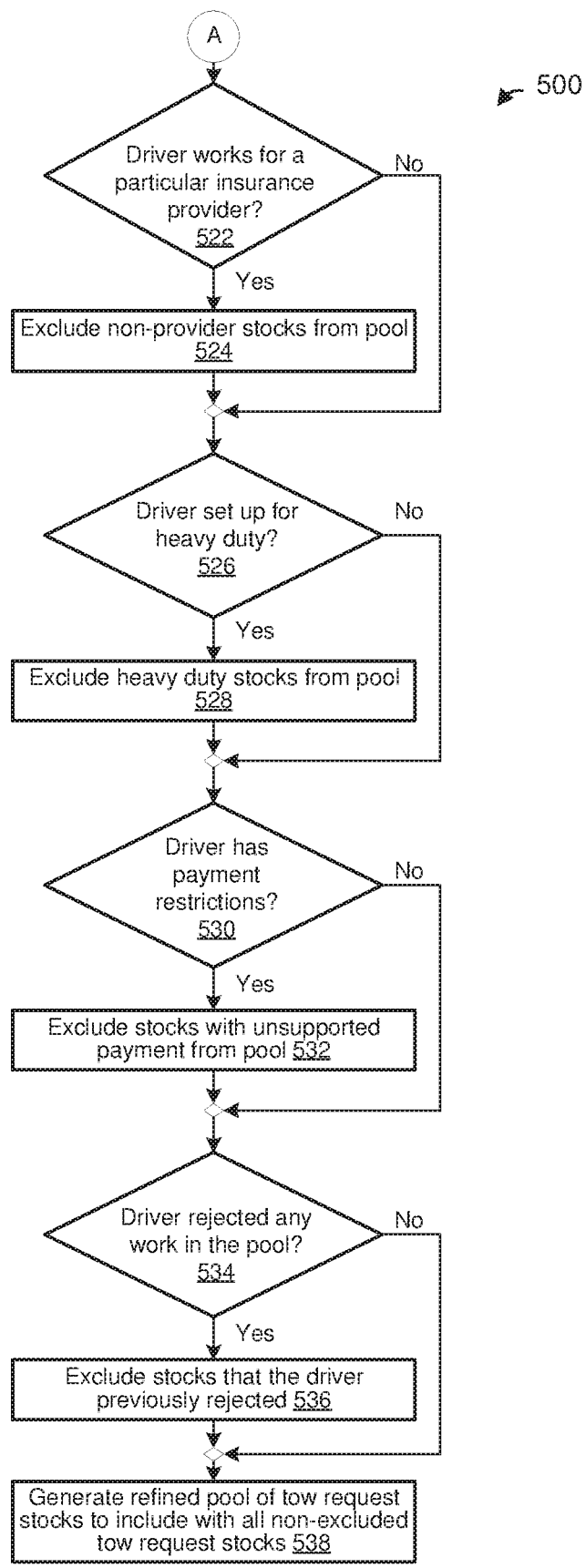

FIGS. 5A-B are diagrams illustrating a process 500 implemented by the auto dispatch system 112 to refine an initial pool of tow request stocks, according to an embodiment. In an embodiment, the process 500 is implemented to refine an initial pool of tow request stocks that may be generated based on a work assignment request message received from a user device 104 of a tow service provider, and may include tow request stocks selected for potential fulfilment by the tow service provider. In an embodiment, the refinement engine 212 of the auto dispatch system 112 implements the process 500. In another embodiment, another suitable component of the auto dispatch system 112 implements the process 500.

Referring first to FIG. 5A, at block 502, the refinement engine 212 determines whether one or more particular towing licenses are required for the pickup in each tow request in the initial pool of tow request stocks. For example, the refinement engine 212 checks whether one or both of residential pickups and business pickups are required for the tow requests in the initial pool of tow request stocks. If the refinement engine 212 determines at block 502 that one or more particular towing licenses are required for the pickup in each tow request in the initial pool of tow request stocks, the process 500 proceeds to block 504 at which the refinement engine 212 determines whether a residential towing license is required for the pickups in the initial pool of tow request stocks. If the refinement engine 212 determines at block 504 that a residential towing license is required for at least one tow request in the initial pool of tow request stocks, then the refinement engine 212 checks at block 506 whether the tow service provider holds a residential towing license. If the refinement engine 212 determines at block 506 that the tow service provider holds a residential towing license, then the at least one tow request stock that requires the residential towing license is included in a refined pool of tow request stock at block 508. Conversely, if the refinement engine 212 determines at block 506 that the tow service provider does not hold a residential towing license, then the at least one tow request stock that requires the residential towing license is excluded from the refined pool of tow request stock at block 518.

The process 500 continues at block 512 at which the refinement engine 212 determines whether a business towing license is required for the pickups in the initial pool of tow request stocks. If the refinement engine 212 determines at block 512 that a business towing license is required for at least one tow request in the initial pool of tow request stocks, then the refinement engine 212 checks at block 514 whether the tow service provider holds a business towing license. If the refinement engine 212 determines at block 514 that the tow service provider holds a business towing license, then the at least one tow request stock that requires the business towing license is included in the refined pool of tow request stock at block 516. Conversely, if the refinement engine 212 determines at block 514 that the tow service provider does not hold a business towing license, then the at least one tow request stock that requires the business towing license is excluded from the refined pool of tow request stock at block 518.

Although the disclosure, and steps 504 and 512 in particular, refer to a residential pickup license and business pickup license, respectively, compliance with other licenses or regulatory requirements may be checked in addition to, or instead of, those licenses, in other embodiments. For example, in some embodiments, the license requirement could be any relevant towing requirement or regulation from a local zoning body, such as a county, township, city, or other government. In some scenarios, the regulations are specific to a zip code or other geographical area.

Referring now to FIG. 5B, the process 500 continues at block 522 at which the refinement engine 212 determines whether the towing service provider provides towing services for only particular insurance providers. Based on the determination made at block 522 the process 500 either proceeds to block 524 or skips the block 524. At block 524, the refinement engine 212 excludes, from the initial pool of tow request stocks, tow request stocks specifying insurance providers other than the particular insurance providers serviced by the tow service provider according to the determination made at block 522. At block 526, the refinement engine 212 determines whether the towing service provider has capabilities for pickup of certain type of vehicles (e.g., whether the tow service provider can handle certain types of vehicles, such as heavy duty vehicles, whether they provide a desired number of axles, vehicle weight, flat bed, winch). Based on the determination made at block 526, the process 500 either proceeds to block 528 or skips the block 528. At block 528, the refinement engine 212 excludes, from the initial pool of tow request stocks, tow request stocks specifying the certain types of vehicles for which the tow request provider does not have capabilities according to the determination made at block 526.

At block 530, the refinement engine 212 determines whether the towing service provider does not access certain types of payments, such as credit card payments. Based on the determination made at block 530, the process 500 either proceeds to block 532 or skips the block 532. At block 532, the refinement engine 212 excludes, from the initial pool of tow request stocks, tow request stocks specifying the certain not accepted by the tow service provider according to the determination made at block 530. At block 534, the refinement engine 212 determines whether the towing service provider has previously rejected tow request stocks in the initial pool of tow request stocks. Based on the determination made at block 534, the process 500 either proceeds to block 536 or skips the block 536. At block 536, the refinement engine 212 excludes, from the initial pool of tow request stocks, tow request stocks that have been previously rejected by the tow service provider according to the determination made at block 534. At block 538, the refinement engine generates a refined pool of tow request stocks to include the tow request stocks that were not excluded by the process 500.

In an embodiment, steps 502, 504, and 512 are omitted and exclusion of stocks for a license requirement is performed in a manner similar to that shown for steps 522 and 524, steps 526 and 528, etc. In other words, the refinement engine 212 determines whether the towing service provider has a particular license and then when the provider does not have a particular license, the refinement engine 212 excludes those stocks that require the license.

Figure 6:
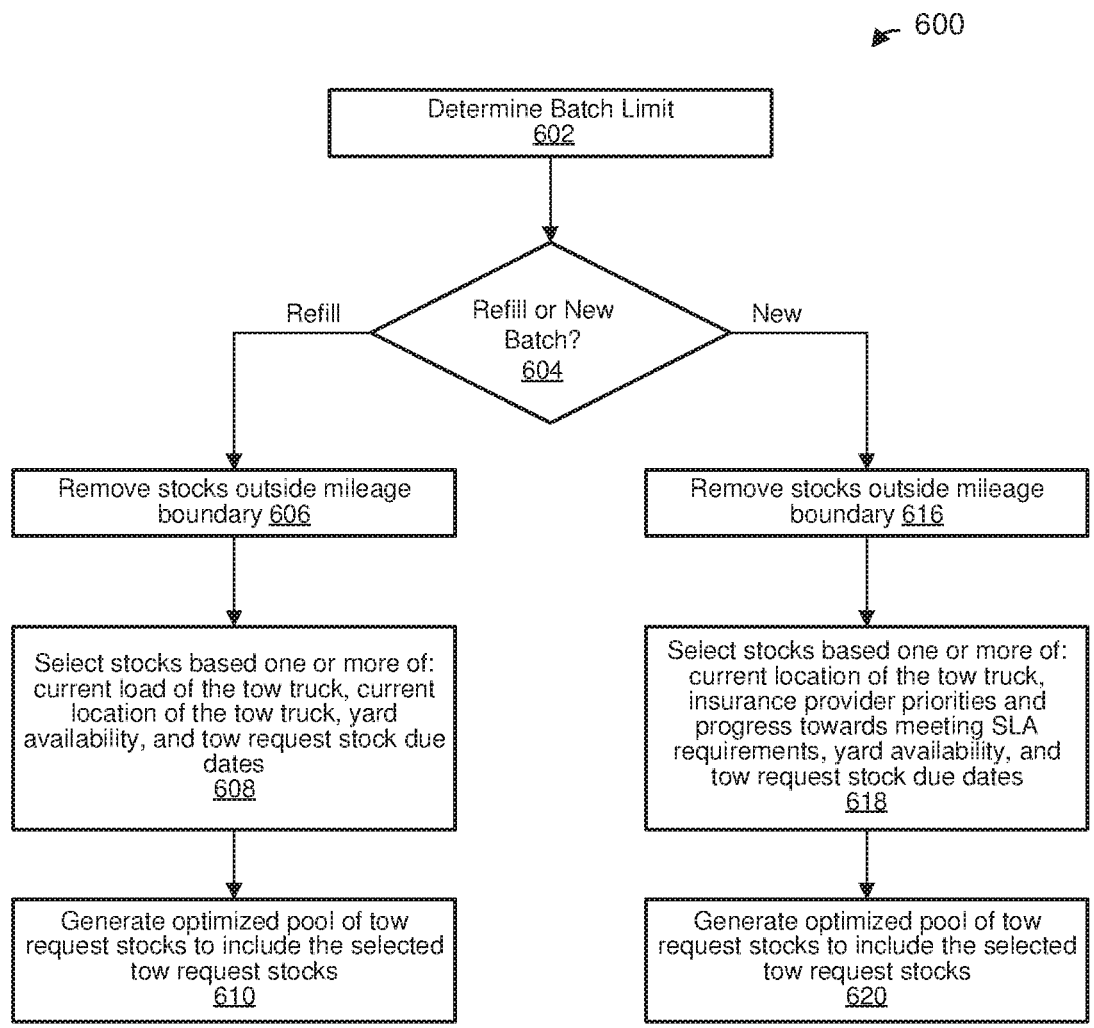
FIG. 6 is a diagram illustrating a process implemented by an auto dispatch system used with the system of FIG. 1 to optimize a refined pool of tow request stocks, according to an embodiment.

FIG. 6 is a diagram illustrating a process 600 implemented by the auto dispatch system 112 to optimize a pool of tow request stocks, according to an embodiment. In an embodiment, the process 600 is implemented to optimize the refined pool of tow request stocks generated by the process 500 of FIGS. 5A-B. In other embodiments, the process 600 is implemented to optimize a refined pool of tow request stocks generated by a suitable process different from the process 500 of FIGS. 5A-B. In an embodiment, the optimization engine 214 of the auto dispatch system 112 implements the process 600. In another embodiment, another suitable component of the auto dispatch system 112 implements the process 600.

At block 602, the optimization engine 214 may determine a batch limit indicating a number of tow request stocks that may be assigned to the tow truck driver. For example, the optimization engine 214 may determine the batch limit by subtracting a current load of the tow truck from a maximum load of the tow truck. At block 604, the optimization engine 214 may determine whether the work assignment request corresponds to a refill batch scenario or a new batch scenario. The optimization engine 214 may determine whether the work assignment request corresponds to a refill batch scenario or a new batch scenario based on a current load of the tow truck. For example, the optimization engine 214 may determine whether the current load of the tow truck is greater than zero. If the current load of the tow truck is greater than zero, this may indicate that the work assignment request corresponds to a refill batch scenario. On the other hand, if the current load of the tow truck is zero, this may indicate that the work assignment request corresponds to a refill batch scenario.

If the optimization engine 214 determines at block 604 that the work assignment request corresponds to a refill batch scenario, then the procedure 600 proceeds to blocks 606-610. At block 606 the optimization engine 214 removes, from the refined pool of tow request stocks, tow request stocks that are outside a certain mileage boundary from a current location of the tow truck. At block 608, the optimization engine 214 selects, from the tow request stocks remaining in the refined pool of tow request stocks, optimally grouped tow request stocks to fill the batch limit calculated at block 602. In an embodiment, the optimization engine 214 selects the tow request stocks based on one or more of i) the current location of the tow truck, ii) availability of space and daily acceptance at one or more tow yards that may be destinations of the vehicles in the tow request stocks, and iii) due times for fulfillment of the tow request stocks. At block 610, the optimization engine 214 generates the optimized pool of tow request stocks to include the tow request stocks selected at block 608.

Referring again to block 604, if the optimization engine 214 determines at block 604 that the work assignment request corresponds to a refill scenario, then the procedure 600 proceeds to blocks 616-620. At block 606 the optimization engine 214 removes, from the refined pool of tow request stocks, tow request stocks that are outside a certain mileage boundary from a current location of the tow truck. At block 618, the optimization engine 214 selects, from the tow request stocks remaining in the refined pool of tow request stocks, optimally grouped tow request stocks to fill the batch limit calculated at block 602. In an embodiment, the optimization engine 214 selects the tow request stocks based on one or more of i) the current location of the tow truck, ii) availability of space and daily acceptance at one or more tow yards that may be destinations of the vehicles in the tow request stocks, and iii) due times for fulfillment of the tow request stocks, iv) priorities of insurance providers that provided the tow request stocks, v) progress towards meeting daily SLA requirements for the insurance providers that provided the tow request stocks, etc. At block 620, the optimization engine 214 generates the optimized pool of tow request stocks to include the tow request stocks selected at block 618.

FIG. 7 is a flow chart of a method for dispatching work assignments to tow service providers, according to an embodiment. In an embodiment, the method 700 is implemented by the auto dispatch system 112 of FIG. 1. In another embodiment, the method 700 is implemented by a suitable dispatch system different from the auto dispatch system 112 of FIG. 1.

At block 702, a work assignment request message is received at an enterprise server from a user device. For example, the work assignment request message is received at the enterprise server 102 from a user device 104. The work assignment request message may be generated by the user device 104 based on input provided by a tow service provider via the user device 104. For example, the work assignment request message may be generated by the auto dispatch application 122 of the user device 104, based on input provided by the tow service provider via a user interface of the auto dispatch application 122.

At block 704, an initial pool of tow request stocks for potential fulfillment by the tow service provider is selected from a set of pending tow request stocks. In an embodiment, the auto dispatch system 112 of the enterprise server 102 selects the initial pool of tow request stocks from the enterprise inventory data based 110*b*. The initial pool of tow request stocks may be selected based on a geographical service area of the tow service provider, for example as indicated in a tow provider profile of the tow service provider, or may be selected according to other suitable selection criteria.

At block 706, a refined pool of tow request stocks is generated based on the initial pool of tow request stocks. For example, the auto dispatch system 112 generates the refined pool of tow request stocks to exclude, from the initial pool of tow request stocks, tow request stocks for which the tow service provider does not meet at least one fulfillment requirement. In an embodiment, the auto dispatch system 112 generates the refined pool of tow request stocks to exclude one or more of i) tow request stocks with pickup locations outside a distance boundary from a current location of the requesting tow service provider, ii) tow request stocks with pickups that require a license that is not held by the requesting tow service provider, iii) tow request stocks associated with specific insurance providers, for example if the tow service provider is not set up to work with the specific insurance providers, iv) tow request stocks that require payment methods not handled by the requesting tow service provider, v) tow request stocks that require pickup capabilities (e.g., whether the tow service provider can handle certain types of vehicles, such as heavy duty vehicles, whether they provide a desired number of axles, vehicle weight, flat bed, winch) not offered by the requesting tow service provider, etc. In an embodiment, the auto dispatch system 112 implements the process 500 of FIGS. 5A-B to generate the refined pool of tow request stocks. In another embodiment, the auto dispatch system 112 implements another suitable process to generate the refined pool of tow request stocks.

At block 708, an optimized pool of tow request stocks is generated based on the refined pool of tow request stocks. For example, the auto dispatch system 112 generates the optimized pool of tow request stocks to include one or more tow request stocks selected, according to one or more optimization criteria, from the refined pool of tow request stocks. The auto dispatch system 112 may select the one or more tow request stocks to be included in the optimized pool of tow request stocks, based, for example, on one or more of i) a current load of a tow truck of the requesting service provider, ii) destinations of vehicles currently on the tow truck of the requesting tow service provider, iii) current capacity of tow yards that may be potential destinations of the vehicles, iv) due times for pickups of the vehicles, etc., in various embodiments. In an embodiment, the auto dispatch system 112 implements the process 600 of FIG. 6 to generate the optimized pool of tow request stocks. In another embodiment, the auto dispatch system 112 implements another suitable process to generate the optimized pool of tow request stocks.

At block 710, one or more work assignment response messages are generated to include information assigning tow request stocks in the optimized pool to the tow service provider. For example, the auto dispatch system 112 may generate the one or more work assignment response messages to include information assigning tow request stocks in the optimized pool to the tow service provider. At block 712 the one or more work assignment response messages are transmitted from the enterprise server device to the user device to provide the information assigning the tow request stocks in the optimized pool of tow request stocks to the user device.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method for dispatching work assignments to tow service providers, the method comprising:
   receiving, at a processor of an enterprise server device, a work assignment request message from a user device, the work assignment request message having been generated by the user device based on input provided by a tow service provider;
   selecting, with the processor from a set of pending tow request stocks, a pool of tow request stocks for fulfillment by the tow service provider,
   the pool of tow request stocks excluding tow request stocks for which the tow service provider does not meet at least one fulfillment requirement;
   selecting one or more tow request stocks from the pool of tow request stocks;
   generating, with the processor, one or more work assignment response messages to include information assigning the one or more tow request stocks, selected from the pool of tow request stocks, to the tow service provider; and causing, with the processor, the one or more work assignment response messages to be transmitted from the enterprise server device to the user device to provide the information assigning tow request stocks in the pool of tow request stocks to the user device.

2. The method of claim 1, wherein
the method further comprises determining, with the processor based on a tow service provider profile maintained by the enterprise server device, one or more of i) that the tow service provider does not have a predetermined towing license, ii) that the tow service provider does not handle a predetermined payment method, and iii) that the tow service provider does not handle a predetermined type of pickup, and selecting the pool of tow request stocks comprises excluding, from the pool of tow request stocks, one or more of i) tow request stocks that require the particular license, ii) tow request stocks that require the particular payment method, and iii) tow request stocks that require the certain type of pickup.

3. The method of claim 1, wherein the step of selecting the one or more tow request stocks comprises selecting the one or more tow request stocks based on one or more of i) a current load of a tow truck of the tow service provider, ii) a maximum load of the tow truck of the tow service provider, iii) a current location of the tow service provider, iv) destinations of vehicles in the current load of the tow truck of the tow service provider, and v) destinations of vehicles in the refined pool of tow request stocks.

4. The method of claim 1, wherein the step of selecting the one or more tow request stocks comprises selecting the one or more tow request stocks based on respective capacities of one or more yards that are one or both of i) destinations of the vehicles in the current load of a tow truck of the tow service provider and ii) destinations of vehicles in the refined pool of tow request stocks.

5. The method of claim 1, wherein the step of selecting the one or more tow request stocks comprises selecting the one or more tow request stocks based on one or more of i) due times for fulfillment of tow requests in the pool of tow requests, ii) priorities of respective insurance providers that provided tow requests in the pool of tow requests, and iii) service level agreements with the insurance providers.

6. The method of claim 1, wherein selecting the pool of tow request stocks for fulfillment by the tow service provider includes selecting the pool of tow request stocks based on whether the tow service provider is working on a catastrophe pickup assignment or a regular pickup assignment.

7. The method of claim 1, wherein
the step of selecting one or more tow request stocks from the pool of tow request stocks is performed based upon one or more optimization criteria.

* * * * *